United States Patent [19]

Yasukawa

[11] Patent Number: 4,518,298
[45] Date of Patent: May 21, 1985

[54] HEAD FOR INDUSTRIAL ROBOT

[75] Inventor: Kazuyoshi Yasukawa, Nagano, Japan

[73] Assignee: Kabushiki Kaisha Sankyo Seiki Seisakusho, Nagano, Japan

[21] Appl. No.: 477,803

[22] Filed: Mar. 22, 1983

[30] Foreign Application Priority Data

Mar. 25, 1982 [JP] Japan .............. 57-42159[U]

[51] Int. Cl.³ .............................................. B25J 15/00
[52] U.S. Cl. .......................................... 414/4; 901/16;
901/21; 901/23; 414/589
[58] Field of Search ................... 414/4, 730, 589, 590;
901/13, 16, 21, 23, 24, 36, 38; 74/25

[56] References Cited

U.S. PATENT DOCUMENTS 3,119,009  1/1964  Zeller ................................. 901/13 X
3,247,978  4/1966  Neumeier ......................... 901/36 X
3,884,363  5/1975  Ajlouny ............................ 901/16 X Primary Examiner—Terrance L. Siemens
Attorney, Agent, or Firm—Sughrue, Mion, Zinn, Macpeak, and Seas

[57] ABSTRACT

A head for an industrial robot comprising, a head body mounted on an end of an arm of the industrial robot, an internal motor, a nut member and a guide member rotatably supported by the head body. A belt drive device is provided between the motor and the nut member. A screw rod passes through and threadedly engages with the nut member. A spline shaft has at a lower end an operating chuck. A connecting device connects the screw rod and the spline shaft to each other in a sealable manner and slide members for preventing rotation of the screw rod. A fluid is supplied to operate the chuck through passages formed in the screw rod and the spline shaft.

16 Claims, 7 Drawing Figures

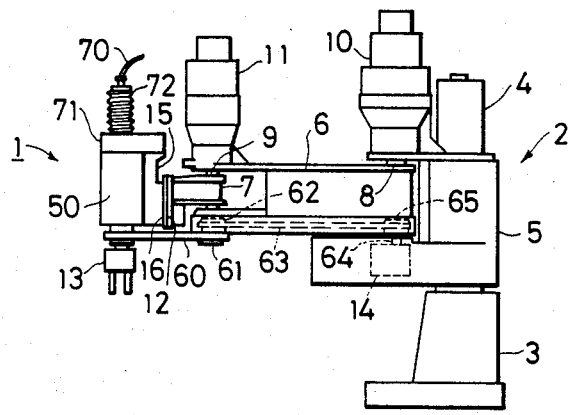
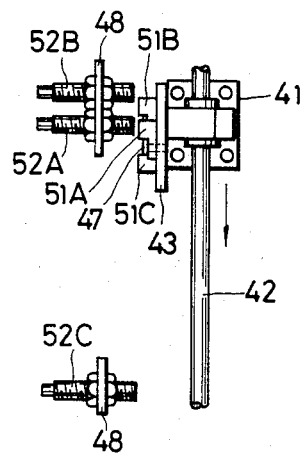
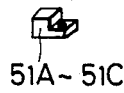
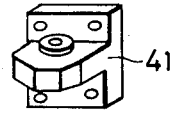

4,518,298

HEAD FOR INDUSTRIAL ROBOT

BACKGROUND OF THE INVENTION

The present invention relates to an industrial robot, and more particularly, to a construction of a head portion at an end of an arm thereof.

For instance, a typical multiarticulated industrial robot has a vertically movable arm at an end of another arm. When the vertically movable arm incorporates therein vertical guide means and drive motors, the total weight of the arm is increased so that a large amount of drive force is required for moving the arm. Also, various mechanical components such as a vertical movement guide and a swivelling mechanism are located at a supporting portion of an operating chuck to make the entire mechanism intricate. Furthermore, since air is introduced from the outside through a flexible tube for driving the chuck, the rotational angle of the chuck is restricted due to the twist of the tube. In addition, since the rotational or swivelling motion of the chuck is not operatively associated with the rotation of the arm, the direction of the chuck varies for each moment of the motion of the arm. Therefore, each time the correction of the direction is required and control therefor is intricate.

SUMMARY OF THE INVENTION

Accordingly, an object of the invention is to provide a head for an industrial robot in order to overcome the above noted defects.

Another object of the invention is to provide a head for an industrial robot, which may operate at a high speed with a small drive force.

Still another object of the invention is to eliminate twists of the exterior piping arrangement.

Still another object of the invention is to provide smooth rotation and movement to the shaft arrangement of the head.

Still another object of the invention is to readily control the posture of the shaft and the chuck of the head.

Still another object of the invention is to accurately control the position of the chuck and the shaft of the head.

These and other objects are attained by providing a head for an industrial robot comprising, a head body mounted on an end of an arm of said industrial robot, a motor for generating a rotational torque, a nut member rotatably supported in said head body, a guide member rotatably supported by said head body, rotational coupling means for drivingly coupling said motor and said nut member to each other, a screw rod passing through said threadedly engaging with said nut member, a shaft having a non-circular shape in cross section, said shaft passing through and engaging with said guide member to rotate together but not move together with said guide member along an axis of said shaft, means for rotatably sealably coupling a lower end of said screw rod and an upper end of said shaft to each other, means for preventing rotation of said screw rod, means for rotating said guide member, and passages formed in said screw rod and shaft.

BRIEF DESCRIPTION OF THE DRAWINGS

FIG. 1 is a side view of an industrial robot;
FIG. 4 is a partially cross sectional plan view taken along the line IV—IV of FIG. 3;
FIG. 5 is a schematical side view of the switch mechanism of the invention;
FIG. 6 is a perspective view of a slide member used in the mechanism shown in FIG. 5;
and
FIG. 7 is a perspective view of a dog used in the mechanism.

DESCRIPTION OF THE PREFERRED EMBODIMENT

Figure 3:
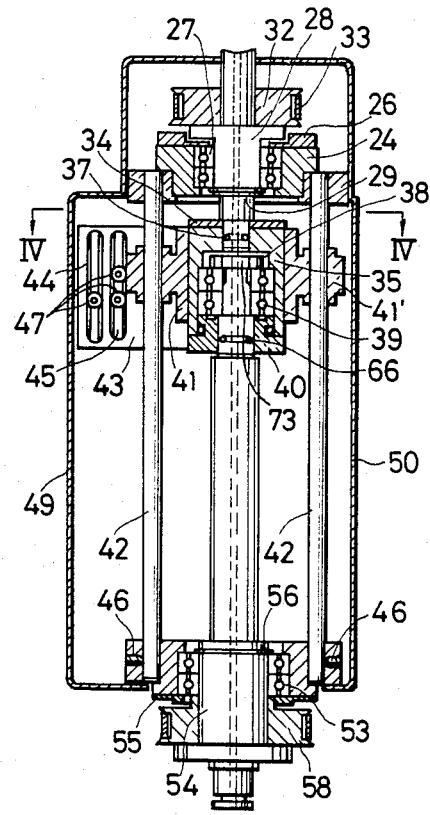
FIG. 3 is a vertical cross-sectional view of the head portion as viewed from the front of the head portion.

The present invention will now be described in detail by way of example with reference to the accompanying drawings.

FIG. 1 illustrates an industrial robot head 1 in a multiarticulated industrial robot 2 according to the present invention. The industrial robot 2 is constructed so that a frame 5 is mounted on a support 4 extending from a base 3. First and second arms 6 and 7 are rotatably mounted on the frame 5 by vertically extending articulating shafts 8 and 9 which are independently driven by DC servo articulation motors 10 and 11. The head 1 for the industrial robot according to the present invention is mounted on a mounting end face 12 of the second arm 7. A stepping motor 14 for swivelling an operating chuck 13 is built in the frame 5. The chuck 13 is mounted in a lower end of the industrial robot head 1 as will be described later.

The head 1 for the industrial robot according to the present invention, includes a head body 15, as shown in FIGS. 1 through 5, which is fixedly secured to the mounting end face 12 at its mounting portion 16 by mounting screws 17. In the head body 15, a support portion 18 and a motor receiving portion 19 are formed between the support portion 18 and the mounting portion 16. A motor 21 for driving the head up and down is mounted on a mounting plate 20 provided at an upper portion of the motor receiving portion 19 with an output shaft 22 thereof being directed upwardly. A belt wheel 23 is secured to the output shaft 22, and a bearing portion 24 is fixed to an upper surface of the motor receiving portion 19. The bearing portion 24 rotatably supports a nut member 28 through a bearing 27 and a stop ring 29 prevents it from being pulled apart from the bearing portion 24. Also, the nut member 28 is threadedly engaged with and penetrated by a vertically extending screw rod 30 having, for example, a square thread. The nut member 28 is fixed at its upper flanged portion to a belt wheel 32 through a fixing screw 31. The belt wheel 32 serves to transmit a rotational torque from an output shaft 22 to the nut member 28 through a timing belt 33 laid around between the belt wheel 32 and the aforesaid belt wheel 23. Thus, the rotational coupling for the motor 21 and the nut member 28 is composed of the belt wheels 23 and 32 and the timing belt 33.

A lower end of the screw rod 30 is disposed in an interior of the support portion 18. A mounting flange 34 is fixed by welding to the lower end of the screw rod 30. A bearing sleeve 35 is fixedly secured to the mounting flange 34 by a mounting screw 36. A lower portion of the screw rod 30 is inserted into a center communication bore 38 of the bearing sleeve 35 through a seal ring 37. A bearing 39 is also received in the lower portion of the communication bore 38 and is supported by a bearing support 40 located thereunder.

A pair of slide members 41 and 41' each having substantially the same form shown in FIG. 6 are fixed by fasteners or screws to the bearing sleeve 35 to extend outwardly therefrom. The slide members 41 and 41' are each slidingly engaged with the guide bars 42 as shown in FIG. 5. The guide bars 42 are fixed to the support portion 18 of the body 15 by screws 46. Thus, the bearing sleeve 35 is movable up and down but prevented from rotating. A dog support plate 43 is fixed to one of the slide members 41 by screws. Two vertical slots 44 and 45 are formed in the support plate 43. In slots 44 and 45, are inserted screws 47 for adjusting and fixing dogs 51A, 51B and 51C (FIG. 7) at predetermined levels. To achieve this, stepped portions are formed to prevent the nuts of the screws 47 from rotating but to allow them to move up and down for level adjustment. Therefore, the screws 47 may be slightly loosened to be movable and tightened at desired levels to carry out the positional adjustment. Limit switches 52A, 52B and 52C are fixed to switch supporting portions 48 for detecting original, upward overrun, and lower limit positions, respectively. FIG. 5 shows the original position where the dog 51A is detected by the switch 52A. Accordingly, by the adjustment of the positions of the dogs 51A, 51B and 51C, a desired vertical movement or stroke of the bearing sleeve 35 may be obtained. Due to some reason, if the bearing sleeve 35 were lifted above the original position, the switch 35B would detect the dogs 51B to thereby interrupt an electric supply and prevent an accident.

On the other hand, the support portion 18 of the head body 15 is adapted to hold rotatably at a lower portion a guide member 54 of spline type through bearings 53 which are supported by a bearing support 55 mounted on a lower end face of the support portion 18. The guide member 54 is prevented from being pulled apart by abutment between the upper bearing 53 and a stop ring 56. The spline type guide member 54 is fixedly provided on its flanged outer periphery with a belt wheel 58 by means of fixing screws 57 and is also reciprocatingly but not rotatably engaged along with its center line with a spline shaft such as a shaft 59 having a non-circular shape in cross section. The belt wheel 58 as shown in FIG. 1 is rotated by timing belt 60 in association with an intermediate belt wheel 61 which is located in the lower portion of the articulation shaft 9 and has a same diameter as that of the belt wheel 58. Also, another intermediate belt wheel which is integrally coupled to the intermediate belt wheel 61 is rotated by a timing belt 63 in association with a belt wheel 65 which is located at a lower portion of the articulation shaft 8, is fixed to an output shaft 64 of the stepping motor 14 and has the same diameter. The timing belt 63 is housed in the first arm 6. These components constitute rotatable joints for the guide member 54.

Figure 2:
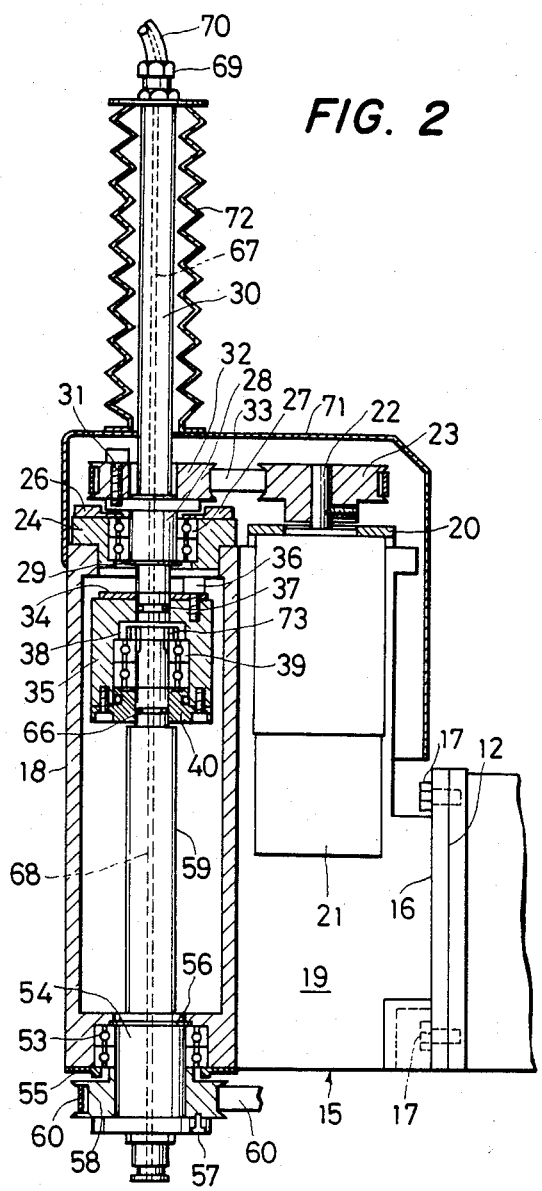
FIG. 2 is a vertical cross-sectional view of the head portion as viewed from the side of the head portion.

Also, the spline shaft 59 having a non-circular shape in cross section holds at its lower end portion a pneumatic (air) drive chuck 13. As shown in FIGS. 2 and 3 the spline shaft 59 is engaged at its upper portion through the bearing support 40 with a bearing 39 and through a seal ring 66. The spline shaft 59 is prevented from being pulled apart from the bearing 39 by the threaded engagement between a nut 73 and a threaded portion of the shaft 59 and is confronted at the upper end with the communication bore 38 of the bearing sleeve 35. Thus, the bearing sleeve 35 constitutes a coupling means for sealably coupling the screw rod 30 and the spline shaft 59. The screw rod 30 and the spline shaft 59 are aligned on a line. Fluid passageways 67 and 68 are formed on the centerline and communicate with each other at the communication bore 38. The fluid passageway of the spline shaft 59 communicates with the chuck 13 at the lower portion whereas the fluid passageway 67 of the screw rod 30 is connected to a drive fluid source, i.e., an air source through an upper coupling 69 and a flexible tube 70.

As illustrated in FIG. 2, a protection cover 71 is mounted on an upper surface of the head body 15, and a dust cover 72 of bellows type is mounted between the protection cover 71 and an upper end of the screw rod 30.

The operation of the thus constructed industrial robot head 1 and industrial robot 2 will now be described.

The articulation motors 10 and 11, respectively, cause the first and second arms 6 and 7 to rotate in a horizontal direction around the articulation shafts 8 and 9, thereby impart a horizontal reciprocating motion to the head 1. Also, the stepping motor 14 causes the guide member 54 and the spline shaft 59 to rotate or swivel through a predetermined angle by means of the timing belt 63 and 60, to thereby determine a rotational angle (in a posture direction) of the chuck 13. At this instance, the shaft 49 is also rotated, but because of the interposition of the bearing 39, the rotational torque is not transmitted to the bearing sleeve 35 or the screw shaft 30. Incidentally, the components such as the belt wheel 58 and 65, intermediate belt wheel 61 and 62 and timing belts 60 and 63 function similar to that of a parallel link mechanism. Therefore, even if the first and second arm 6 and 7 are rotated, the posture direction of the chuck 13 remains unchanged from the selected angle.

The vertical movement of the chuck 13 is carried out by the rotation of the motor 21 for vertical movement. More specifically, a rotational torque of its output shaft is transmitted through the belt wheel 23, the timing belt 33 and the belt wheel 32 to the nut member 28, whereupon the nut member 28 drives in response to the transmitted torque direction the screw rod 30, engaged threadedly therewith, in the upper or lower direction. Upon rotational driving, although the screw rod 30 tends to rotate together with the nut member 28, the attendant rotation of the screw rod 30 is prevented by the slide members 41 amd 41' on the bearing sleeve 35 side and the guide bars 42 fixed to the head body 15. The up and down movement of the screw rod 30 is transmitted to the spline shaft 59 through the bearing sleeve 35 and the bearing 39. Accordingly, the spline shaft 59 is moved relative to the guide member 54 of spline type and imparts an up and down movement to the lower chuck 13 in compliance with the rotation of the first and second arms 6 and 7. The upper and lower limits of the movement of the chuck 13 may be set by detecting the vertical movement of the dogs 51A, 51C with the limit switches 52A and 52C and controlling the rotation of the motor 21 for the vertical movement.

The opening/closing operation of the chuck 13 may be carried out by feeding thereto air through the fluid passageways 67 and 68. The fluid passageways 67 and 68 are located on the rotational centerline and formed in the interiors of both the screw rod 30 and the shaft 59. Therefore, the passageways are not influenced by the vertical and rotational movements of these members.

In the foregoing embodiment, the screw rod 30 has a square thread to enhance mechanical accuracy. However, the screw thread form is not limited to such a form and the screw rod 30 may have a trapezoidal thread, round thread or the like. Since it is sufficient that the shaft 59 allows the guide member 54 to move up and down and transmits its rotation, it is possible to replace the spine shaft by a shaft having a non-circular shape in cross section. Also, the coupling means for coupling rotatably the motor 21 and the nut member 28, the coupling means for coupling rotatably the screw rod 30 and the shaft 59, the rotation preventing means for the screw rod 30 and the rotating means for the guide member 54 are not limited to those shown in the drawings and various modifications thereof are possible.

The present invention has the following particular advantages.

Since a part of head body is fixed to the arm and the vertically movable components, i.e., the screw rod and the chuck supporting shaft are separated from the drive components, i.e., the motors, the nut members and the guide member, it is possible to operate the apparatus at a high speed with a small drive force. Also, since the fluid passageways for the chuck driving are formed on a centerline for the vertical movement and rotational movement in the interiors of the screw rod and the shaft, upon the rotation, no twist will occur unlike the exterior piping arrangement, and further the shaft and the guide members are vertically movably but not rotatably coupled to each other, the vertical movement and rotation of the shaft are completely independent without any mutual adverse effect. Furthermore, since the guide member is moved in association with the drive means such as the stepping motor by the rotation transmission means (belt wheels, intermediate belt wheels and the timing belts), the directions of the shaft and the chuck are maintained constant upon the rotation of the arms. Accordingly, the posture control may be dispensed with upon the rotation of the arms. Furthermore, the rotational amount and rotational angle of the motor for vertical movement may be accurately detected by an encoder or the like, and its control is relatively easy in comparison with the cylinder type with a high accuracy so that the accurate positional control in the vertical direction may be realized.

What is claimed is:

1. A head for an industrial robot comprising,
a head body (15) mounted on an end of an arm of said industrial robot,
a motor (21) for generating a rotational torque,
a nut member (28) rotatably supported in said head body,
a guide member (54) rotatably supported by said head body,
rotational coupling means for drivingly coupling said motor and said nut member to each other,
a screw rod (30) passing through and threadedly engaging with said nut member,
a shaft (59) having a non-circular shape in cross section, said shaft passing through and engaging with said guide member to rotate with said guide member but not move with said guide member longitudinally on an axis of said shaft,
means for rotatably sealably coupling a lower end of said screw rod and an upper end of said shaft to each other,
means for preventing rotation of said screw rod,
means for rotating said guide member (54), and
passages (67, 68) formed in said screw rod and said shaft.

2. The head according to claim 1, wherein said motor (21) is built in said head body (15).

3. The head according to claim 2, said rotational coupling means including a belt wheels (23) coupled to an output shaft (22) of said motor, an associated belt wheel (32) fixed to said nut member (28) and a transmission belt (33) laid around said belt wheel and said associated belt wheel.

4. The head according to claim 1, further comprising a chuck 13 and an air source, said air source being operatively connected to the passages formed in said screw rod to actuate said chuck.

5. The head according to claim 1, said shaft (59) comprising a spline shaft.

6. The head according to claim 1, said means for rotatably sealably coupling including a bearing sleeve (35) and first bearing means (39) for rotatably supporting said shaft (59) at the upper end thereof.

7. The head according to claim 6, wherein a communication bore (38) is defined by said bearing sleeve (35) and said bearing means, said means for rotatably sealably coupling further including sealing means for sealing said communication bore except for said passages formed in said screw rod and said shaft.

8. The head according to claim 7, said means for preventing rotation of said screw rod comprising a pair of slide members (41, 41') fixed to said bearing sleeve (35) and a pair of guide bars (42) fixedly secured to said head body whereby upon rotation of said motor (21) said slide members are moved up and down together with said bearing sleeve.

9. The head according to claim 8, further comprising a bearing sleeve position detecting means including first and second limit switches (52A, 52C) provided on said head body and first and second dogs (51A, 51C) provided on one of said slide members (41) for detecting original and lower limit positions of said bearing sleeve.

10. The head according to claim 9, said bearing sleeve position detecting means further including a third switch (52B) provided on said head body and a thirst dog (51B) provided on one of siad members for detecting an overrun position of said bearing sleeve.

11. The head according to claim 10, further including position adjusting means for adjusting positions of said first, second and third dogs, respectively.

12. The head according to claim 11, said position adjusting means comprising a nut and a screw (47), said screw passing through a slot formed in a dog support plate (43) fixedly secured to one of said slide members.

13. The head according to claim 1, further including a second bearing means (27) for rotatably supporting said nut member (28) to said head body.

14. The head according to claim 1, further including a third bearing means (53) for rotatably supporting said guide member (54) to said head body.

15. The head according to claim 9, further including covering (49) for housing said bearing sleeve position detecting means.

16. The head according to claim 1, wherein said means for rotating said guide member (54) may be driven by a belt of said industrial robot.

* * * * *